(12) United States Patent
Iwadate (10) Patent No.: US 10,649,762 B2
(45) Date of Patent: May 12, 2020

(54) APPARATUS THAT CAN PERFORM PARALLEL UPDATING USING DATA SAVED IN DIFFERENT MEMORIES, CONTROL METHOD, AND STORAGE MEDIUM

(71) Applicant: CANON KABUSHIKI KAISHA, Tokyo (JP)

(72) Inventor: Yasuhiro Iwadate, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/181,525

(22) Filed: Nov. 6, 2018

(65) Prior Publication Data

US 2019/0155596 A1    May 23, 2019

(30) Foreign Application Priority Data

Nov. 20, 2017  (JP) ................................ 2017-222817

(51) Int. Cl.
    *G06K 15/00*    (2006.01)
    *G06F 8/654*    (2018.01)
    *G06F 11/14*    (2006.01)
    *G06F 3/12*     (2006.01)
    *G06F 16/23*    (2019.01)

(52) U.S. Cl.
    CPC .............. *G06F 8/654* (2018.02); *G06F 3/122* (2013.01); *G06F 3/123* (2013.01); *G06F 3/1285* (2013.01); *G06F 11/1433* (2013.01); *G06F 16/2365* (2019.01); *G06F 2201/84* (2013.01)

(58) Field of Classification Search
    None
    See application file for complete search history.

(56) References Cited

U.S. PATENT DOCUMENTS

| | | | | |
|---|---|---|---|---|
| 2012/0005525 | A1* | 1/2012 | Takeuchi | G06F 11/165 714/12 |
| 2013/0179871 | A1* | 7/2013 | Nagao | G06F 8/65 717/170 |
| 2013/0290946 | A1 | 10/2013 | Iwadate | |
| 2014/0019658 | A1* | 1/2014 | Ho | G06F 13/4063 710/300 |
| 2014/0373000 | A1* | 12/2014 | Kanematsu | G06F 8/65 717/170 |
| 2017/0139778 | A1* | 5/2017 | Kito | G06F 8/66 |

FOREIGN PATENT DOCUMENTS

JP          2002189631 A    7/2002

* cited by examiner

*Primary Examiner* — Henok Shiferaw
(74) *Attorney, Agent, or Firm* — Venable LLP (57) ABSTRACT

An object of the present invention is to reduce a time taken for updating of firmware data using unrecoverable data in an apparatus having a plurality of nonvolatile memories. The present invention is an apparatus having a plurality of nonvolatile memories, the apparatus including: an acquisition unit configured to acquire firmware updating data for updating firmware data saved in each of the plurality of nonvolatile memories; and a control unit configured to perform control so as to perform in parallel updating of the firmware data saved in a first nonvolatile memory by unrecoverable data included in the acquired firmware updating data and updating of the firmware data saved in a second nonvolatile memory by the unrecoverable data.

20 Claims, 8 Drawing Sheets

| ID | TagName (1[byte]) | Target (1[byte]) | DataType (1[byte]) | StartAddress (4[byte]) | Length (4[byte]) |
|---|---|---|---|---|---|
| A1 | BEGIN(1) | | | | |
| A2 | TYPE(3) | PrintEngine(3) | | | |
| A3 | DATA(4) | SoC1 SROM(1) | Recovery:NG(0) | 0xFFFF0000 | 0x6000 |
| A4 | DATA(4) | SoC1 SROM(1) | Recovery:OK(1) | 0xF0000000 | 0x30000 |
| A5 | DATA(4) | SoC2 SROM(2) | Recovery:OK(1) | 0xF0000000 | 0x36000 |
| A6 | DATA(4) | SoC2 SROM(2) | Recovery:NG(0) | 0xFFFF0000 | 0x6000 |
| A7 | END(2) | | | | |

FIG. 5A

| ID | TagName (1[byte]) | Target (1[byte]) | DataType (1[byte]) | StartAddress (4[byte]) | Length (4[byte]) |
|---|---|---|---|---|---|
| B1 | BEGIN(1) | | | | |
| B2 | TYPE(3) | PrintEngine(3) | | | |
| B3 | DATA(4) | SoC1 SROM(1) | Recovery:NG(0) | 0xFFFF0000 | 0x6000 |
| B4 | DATA(4) | SoC2 SROM(2) | Recovery:NG(0) | 0xFFFF0000 | 0x6000 |
| B5 | DATA(4) | SoC1 SROM(1) | Recovery:OK(1) | 0xF0000000 | 0x30000 |
| B6 | DATA(4) | SoC2 SROM(2) | Recovery:OK(1) | 0xF0000000 | 0x36000 |
| B7 | END(2) | | | | |

APPARATUS THAT CAN PERFORM PARALLEL UPDATING USING DATA SAVED IN DIFFERENT MEMORIES, CONTROL METHOD, AND STORAGE MEDIUM

BACKGROUND OF THE INVENTION

Field of the Invention

The present invention relates to a technique for secure updating of firmware data.

Description of the Related Art

In a nonvolatile memory mounted on an apparatus with which firmware is embedded, code-executable firmware data is saved and there is a case where the firmware data is updated due to a factor, such as correction of trouble and addition of a function. In updating of firmware data such as this, in the case where a shutdown, such as a power failure, occurs during execution of updating, updating processing is aborted without data consistency at the time of writing being maintained. Consequently, a technique to reduce the updating time of firmware is required.

Japanese Patent Laid-Open No. 2002-189631 has disclosed that the data write time is reduced by dividing data desired to be written and multiplexing writing to a plurality of nonvolatile memories.

SUMMARY OF THE INVENTION

Here, there is a case where firmware data includes data (unrecoverable data) that cannot be recovered unless consistency is maintained and data (recoverable data) that can be recovered by performing updating of firmware data again even though consistency is not maintained.

However, Japanese Patent Laid-Open No. 2002-189631 does not take into consideration the concept of unrecoverable data and recoverable data. Because of this, the total updating time of firmware data is reduced by multiplexing of writing, but there is a possibility that the time taken for updating of firmware data using unrecoverable data, which is particularly desired to be reduced, does not change.

Consequently, in view of the above-described problem, an object of the present invention is to reduce the time taken for updating of firmware data using unrecoverable data in an apparatus having a plurality of nonvolatile memories.

The present invention is an apparatus having a plurality of nonvolatile memories, the apparatus including: an acquisition unit configured to acquire firmware updating data for updating firmware data saved in each of the plurality of memories; and a control unit configured to perform control so as to perform in parallel updating of the firmware data saved in a first nonvolatile memory by unrecoverable data included in the acquired firmware updating data and updating of the firmware data saved in a second nonvolatile memory by the unrecoverable data.

Further features of the present invention will become apparent from the following description of exemplary embodiments with reference to the attached drawings.

DESCRIPTION OF THE EMBODIMENTS

Figure 1:
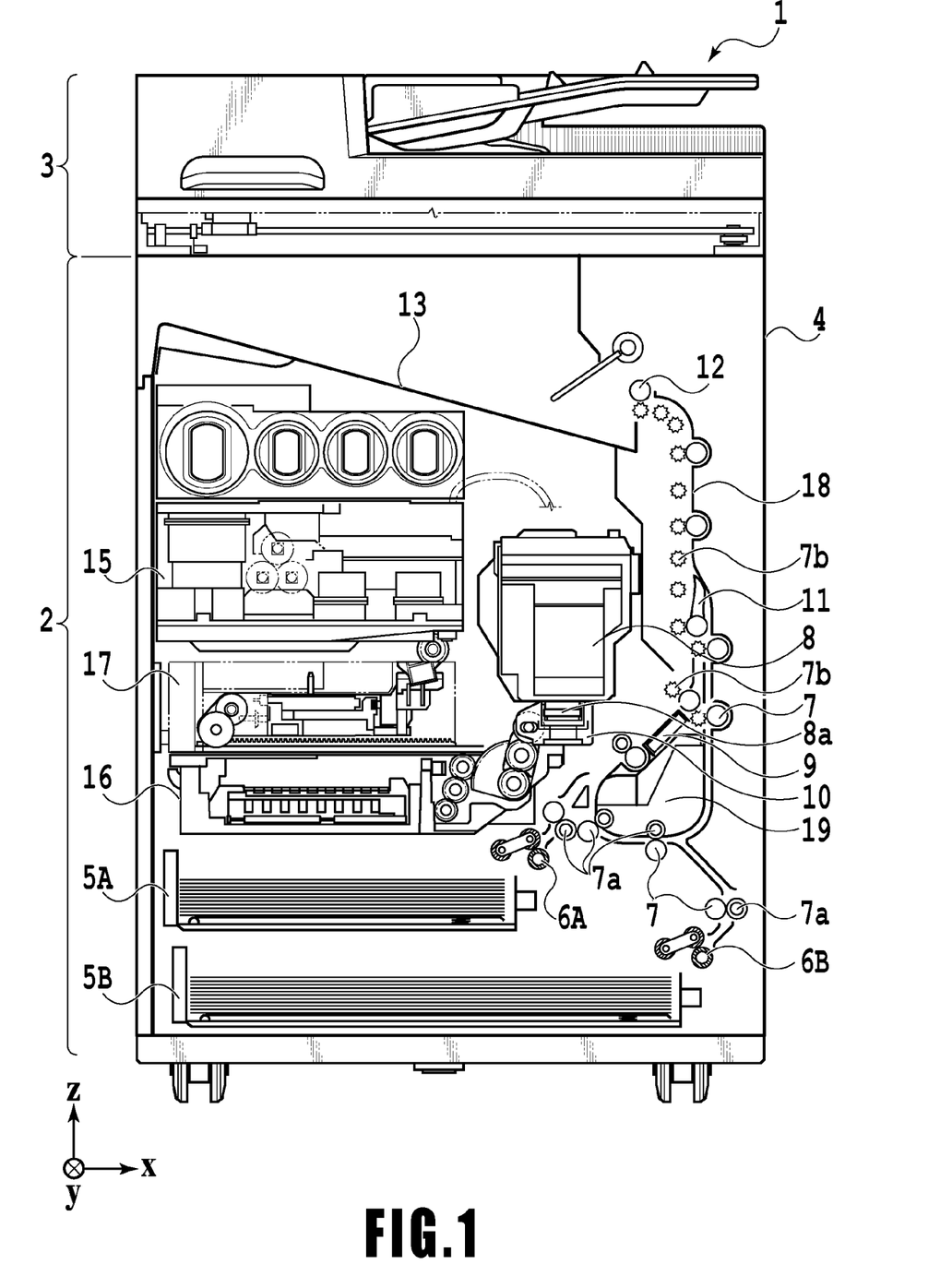
FIG. 1 is a diagram in the case where a printing apparatus in an embodiment of the present invention is in a standby state.

FIG. 1 is an internal configuration diagram of an ink jet printing apparatus 1 (hereinafter, printing apparatus 1) used in the present embodiment. In FIG. 1, the x-direction indicates the horizontal direction, the y-direction (direction perpendicular to the paper surface) indicates the direction in which ejection ports are arrayed in a print head 8, to be described later, and the z-direction indicates the vertical direction, respectively.

The printing apparatus 1 is an MFP (Multi Function Peripheral) including a print unit 2 and a scanner unit 3 and capable of performing various kinds of processing relating to the printing operation and the reading operation by the print unit 2 and the scanner unit 3 individually, or by an interlocking manner of the print unit 2 and the scanner unit 3. The scanner unit 3 includes an ADF (Auto Document Feeder) and an FBS (Flat Bed Scanner) and is capable of reading of a document automatically fed by the ADF and reading (scanning) of a document placed on a document table of the FBS by a user. The present embodiment is the MFP having both the print unit 2 and the scanner unit 3, but the MFP may be an aspect in which the scanner unit 3 is not included. FIG. 1 shows the case where the printing apparatus 1 is in a standby state where the printing apparatus 1 is performing neither the printing operation nor the reading operation.

In the print unit 2, at the bottom in the vertically downward direction of a body 4, a first cassette 5A and a second cassette 5B for storing a printing medium (cut sheet) S are installed in an attachable and detachable manner. In the first cassette 5A, comparatively small printing media up to the A4 size, and in the second cassette 5B, comparatively large printing media up to the A3 size are stored in a piled-up manner. In the vicinity of the first cassette 5A, a first feed unit 6A for feeding stored printing media by separating one by one is provided. Similarly, in the vicinity of the second cassette 5B, a second feed unit 6B is provided. In the case where the printing operation is performed, the printing medium S is selectively fed from one of the cassettes.

A conveyance roller 7, a discharge roller 12, a pinch roller 7a, a spur 7b, a guide 18, an inner guide 19, and a flapper 11 are conveyance mechanisms for guiding the printing medium S in a predetermined direction. The conveyance roller 7 is arranged on the upstream side of the print head 8 and is a drive roller that is driven by a conveyance motor, not shown schematically. The pinch roller 7a is a follower roller that nips and rotates the printing medium S together with the conveyance roller 7. The discharge roller 12 is arranged on the downstream side of the print head 8 and is a drive roller that is driven by a conveyance roller, not shown schematically. The spur 7b sandwiches and conveys the printing medium S together with the discharge roller 12.

The guide 18 is provided in the conveyance path of the printing medium S and guides the printing medium S in a predetermined direction. The inner guide 19 is a member extending in the y-direction and has a curved side surface, and guides the printing medium S along the side surface. The flapper 11 is a member for switching directions in which the printing medium S is conveyed at the time of the double-sided printing operation. A discharge tray 13 is a tray for loading and holding the printing medium S for which the printing operation is completed and which is discharged by the discharge roller 12.

The print head 8 of the present embodiment is a color ink jet print head of full line type and in which a plurality of ejection ports from which ink is ejected in accordance with print data is arrayed along the y-direction in FIG. 1 so as to correspond to the width of the printing medium S. In the case where the print head 8 is at the standby position, an ejection port surface 8a of the print head 8 is capped by a cap unit 10 as shown in FIG. 1. In the case where the printing operation is performed, by a print controller 202, to be described later, the direction of the print head 8 is changed so that the ejection port surface 8a faces a platen 9. The platen 9 is made up of a flat plate extending in the y-direction and supports the printing medium S from the rear side, for which the printing operation is performed by the print head 8.

Figure 2:
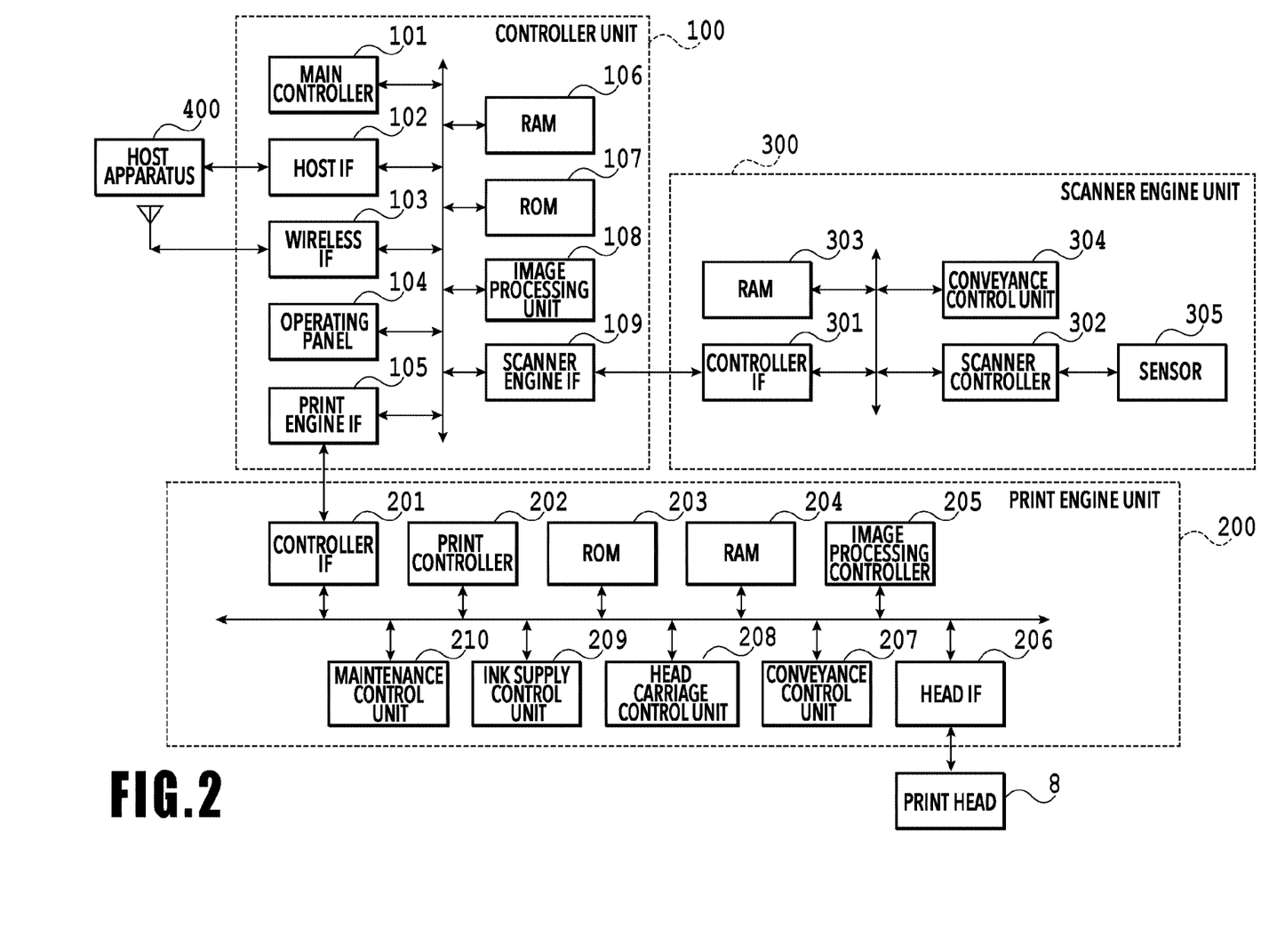
FIG. 2 is a control configuration diagram of the printing apparatus in the embodiment of the present invention.

FIG. 2 is a block diagram showing a control configuration in the printing apparatus 1. The control configuration includes a print engine unit 200 configured to centralizedly control the print unit 2 mainly, a scanner engine unit 300 configured to centralizedly control the scanner unit 3, and a controller unit 100 configured to centralizedly control the entire printing apparatus 1. The print controller 202 controls various mechanisms of the print engine unit 200 in accordance with instructions of a main controller 101 of the controller unit 100. Various mechanisms of the scanner engine unit 300 are controlled by the main controller 101 of the controller unit 100. In the following, details of the control configuration are explained.

In the controller unit 100, the main controller 101 including a CPU controls the entire printing apparatus 1 by using a RAM 106 as a work area in accordance with programs and various parameters stored in a ROM 107. For example, in the case where a print job is input from a host apparatus 400 via a host IF 102 or a wireless IF 103, predetermined image processing is performed for image data received by an image processing unit 108 in accordance with instructions of the main controller 101. Then, the main controller 101 transmits the image data for which image processing has been performed to the print engine unit 200 via a print engine IF 105. In the present specification, IF is an abbreviation of an interface.

The printing apparatus 1 may acquire image data from the host apparatus 400 via wireless communication or wired communication or may acquire image data from an external storage device (USB memory and the like) connected to the printing apparatus 1. The communication method that is made use of for wireless communication or wired communication is not limited. For example, as the communication method that is made use of for wireless communication, it is possible to apply Wi-Fi (Wireless Fidelity) (registered trademark) and Bluetooth (registered trademark). Further, as the communication method that is made use of for wired communication, it is possible to apply USB (Universal Serial Bus) and the like. Furthermore, for example, in the case where a read command is input from the host apparatus 400, the main controller 101 transmits this command to the scanner engine unit 300 via a scanner engine IF 109.

An operation panel 104 is a mechanism for a user to input and output for the printing apparatus 1. It is possible for a user to give instructions as to the operation, such as copy and scan, to set a printing mode, to recognize information on the printing apparatus 1 and so on via the operation panel 104.

In the print engine unit 200, the print controller 202 including a CPU controls various mechanisms included in the print unit 2 by using a RAM 204 as a work area in accordance with programs and various parameters stored in a ROM 203. In the case where various commands and image data are received via a controller IF 201, the print controller 202 temporarily saves them in the RAM 204. The print controller 202 causes an image processing controller 205 to convert the saved image data into print data so that the print head 8 can make use of for the printing operation. In the case where print data is generated, the print controller 202 causes the print head 8 to perform the printing operation based on the print data via a head IF 206. At this time, the print controller 202 conveys the printing medium S by driving the feed units 6A and 6B, the conveyance roller 7, the discharge roller 12, and the flapper 11 shown in FIG. 1 via a conveyance control unit 207. In accordance with instructions of the print controller 202, the printing operation by the print head 8 is performed by interlocking the conveyance operation of the printing medium S and thus printing processing is performed. Here, the configuration is shown in which the print engine unit 200 includes the one controller IF 201, the one print controller 202 including a CPU, the one ROM 203, and the one RAM 204, respectively. However, it may also be possible for the print engine unit 200 to include a plurality of the components.

A head carriage control unit 208 changes the direction and position of the print head 8 in accordance with the operating state, such as the maintenance state and the printing state, of the printing apparatus 1. An ink supply control unit 209 controls an ink supply unit 15 so that the pressure of the ink supplied to the print head 8 is adjusted within an appropriate range. A maintenance control unit 210 controls the operation of the cap unit 10 in a maintenance unit 16 and a wiping unit 17 at the time of performing the maintenance operation for the print head 8.

In the scanner engine unit 300, the main controller 101 controls hardware resources of a scanner controller 302 by using the RAM 106 as a work area in accordance with programs and various parameters stored in the ROM 107. Due to this, various mechanisms included in the scanner unit 3 are controlled. For example, by the main controller 101 controlling the hardware resources within the scanner controller 302 via a controller IF 301, a document mounted on the ADF by a user is conveyed via a conveyance control unit 304 and read by a sensor 305. Then, the scanner controller 302 saves the read image data in a RAM 303. It is possible for the print controller 202 to cause the print head 8 to perform the printing operation based on the image data read by the scanner controller 302 by converting the image data acquired as described above into print data.

First Embodiment

<About Print Engine Unit>

Figure 3:
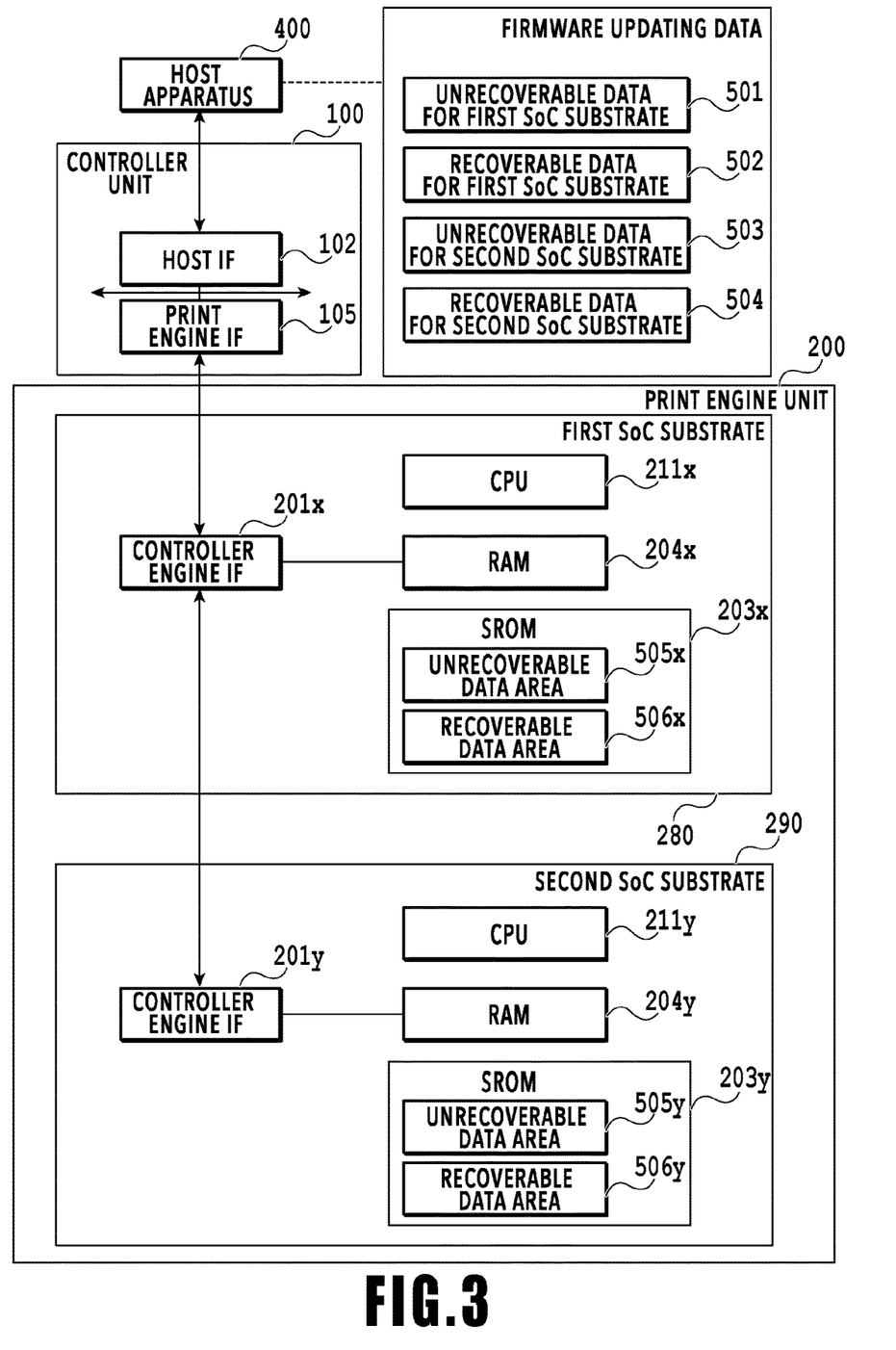
FIG. 3 is a detailed configuration diagram of a print engine unit in a first embodiment.

In the following, a detailed configuration of the print engine unit 200 in the present embodiment is explained by using FIG. 3. FIG. 3 is a block diagram for explaining the detailed configuration of the print engine unit 200 in the present embodiment.

The print engine unit 200 in the present embodiment includes a first SoC (System-on-a-chip) substrate 280 and a second SoC substrate 290. The first SoC substrate 280 has a controller engine IF 201x, a serial ROM (hereinafter, abbreviated to SROM) 203x, a RAM 204x, and a CPU 211x. The controller engine IF 201x includes PCI Express (hereinafter, abbreviated to PCIe), USB, Ethernet and so on. In the SROM 203x, an unrecoverable data area 505x in which unrecoverable data is arranged and a recoverable data area 506x in which recoverable data is arranged are provided. Details of unrecoverable data and recoverable data will be described in detail at the time of explanation of FIG. 4A and FIG. 4B.

The second SoC substrate 290 also has the same configuration as that of the first SoC substrate 280. That is, the second SoC substrate 290 has a controller engine IF 201y, an SROM 203y, a RAM 204y, and a CPU 211y and in the SROM 203y, an unrecoverable data area 505y and a recoverable data area 506y are provided. As described above, the print engine unit 200 includes the two SoC substrates having the same configuration. In the present embodiment, to the first SoC substrate 280, the cap unit 10 in the maintenance unit 16 and the wiping unit 17 are connected and to the second SoC substrate 290, the conveyance control unit 207 and the head IF 206 are connected. By making the configuration such as this, it is made possible to perform distributed processing of various kinds of processing relating to mechanism control, image processing and so on by the two SoC substrates.

The host apparatus 400 in the present embodiment is a source of transmission that transmits data (hereinafter, referred to as firmware updating data) for updating firmware data saved in the printing apparatus 1 to the printing apparatus 1. The firmware updating data transmitted by the printing apparatus 1 is turned into a package. In the following, the case is explained where in the firmware updating data, unrecoverable data 501 and recoverable data 502 for the first SoC substrate 280 and unrecoverable data 503 and recoverable data 504 for the second SoC substrate 290 are included. The (structure of the) firmware updating data turned into a package will be described later in detail (see FIG. 5A and FIG. 5B). Further, here, the case is described where the host apparatus 400 transmits the firmware updating data to the printing apparatus 1, but the aspect in which the printing apparatus 1 acquires the firmware updating data is not limited to this. For example, it may also be possible for the printing apparatus 1 to acquire the firmware updating data by using a storage medium, such as a USB and a CD-ROM, in which the firmware updating data is saved.

The firmware updating data transmitted to the printing apparatus 1 by the host apparatus 400 is delivered to the print engine unit 200 via the controller unit 100. Finally, of the firmware updating data, the unrecoverable data 501 for the first SoC substrate 280 is arranged in the unrecoverable data area 505x and the recoverable data 502 is arranged in the recoverable data area 506x. Further, of the firmware updating data, the unrecoverable data 503 for the second SoC substrate 290 is arranged in the unrecoverable data area 505y and the recoverable data 504 is arranged in the recoverable data area 506y.

<About Updating Processing of Firmware Data>

Figure 4A:
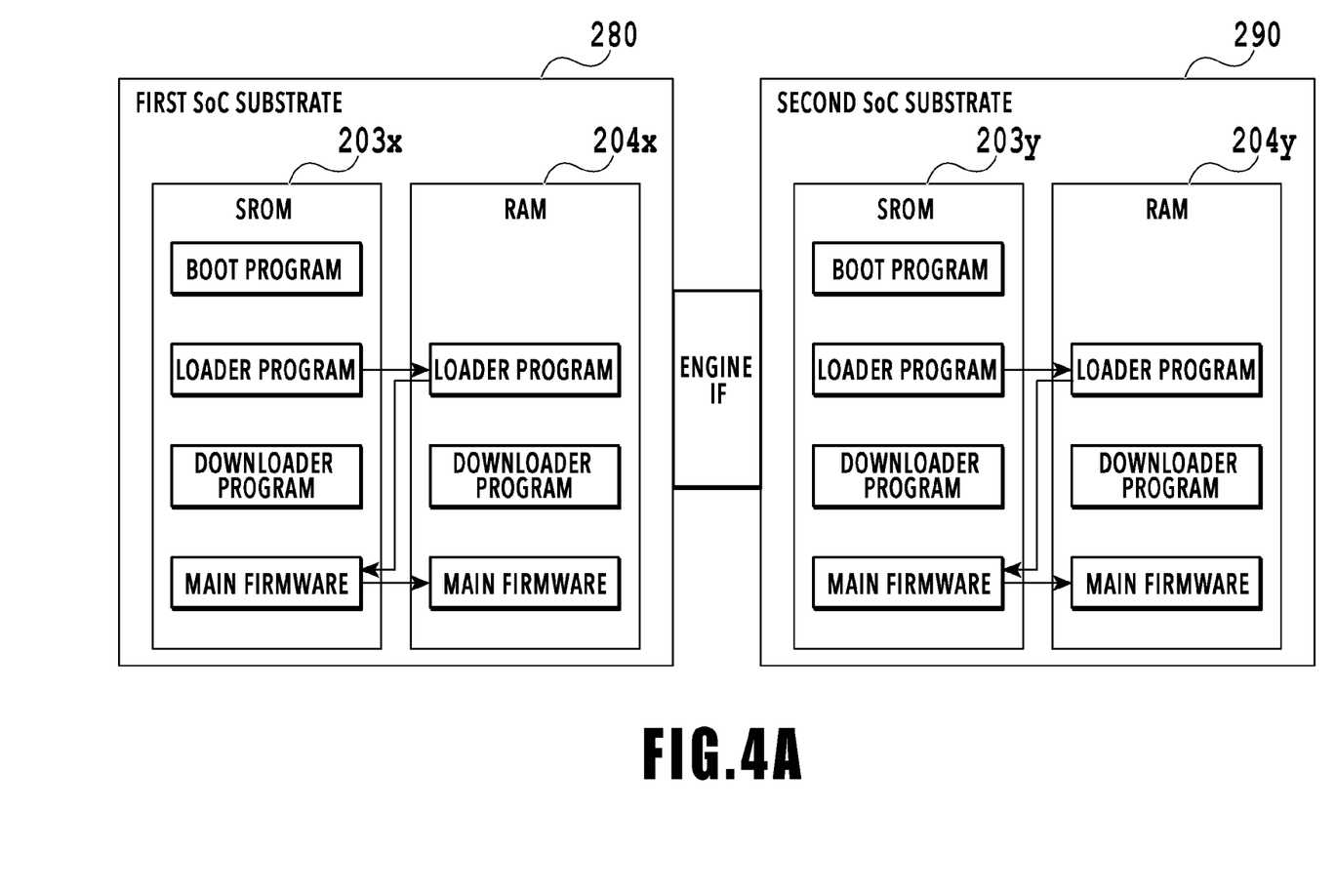
FIG. 4A and FIG. 4B are explanatory diagrams of operations in a normal mode and a firmware updating mode in the first embodiment.
Figure 4B:
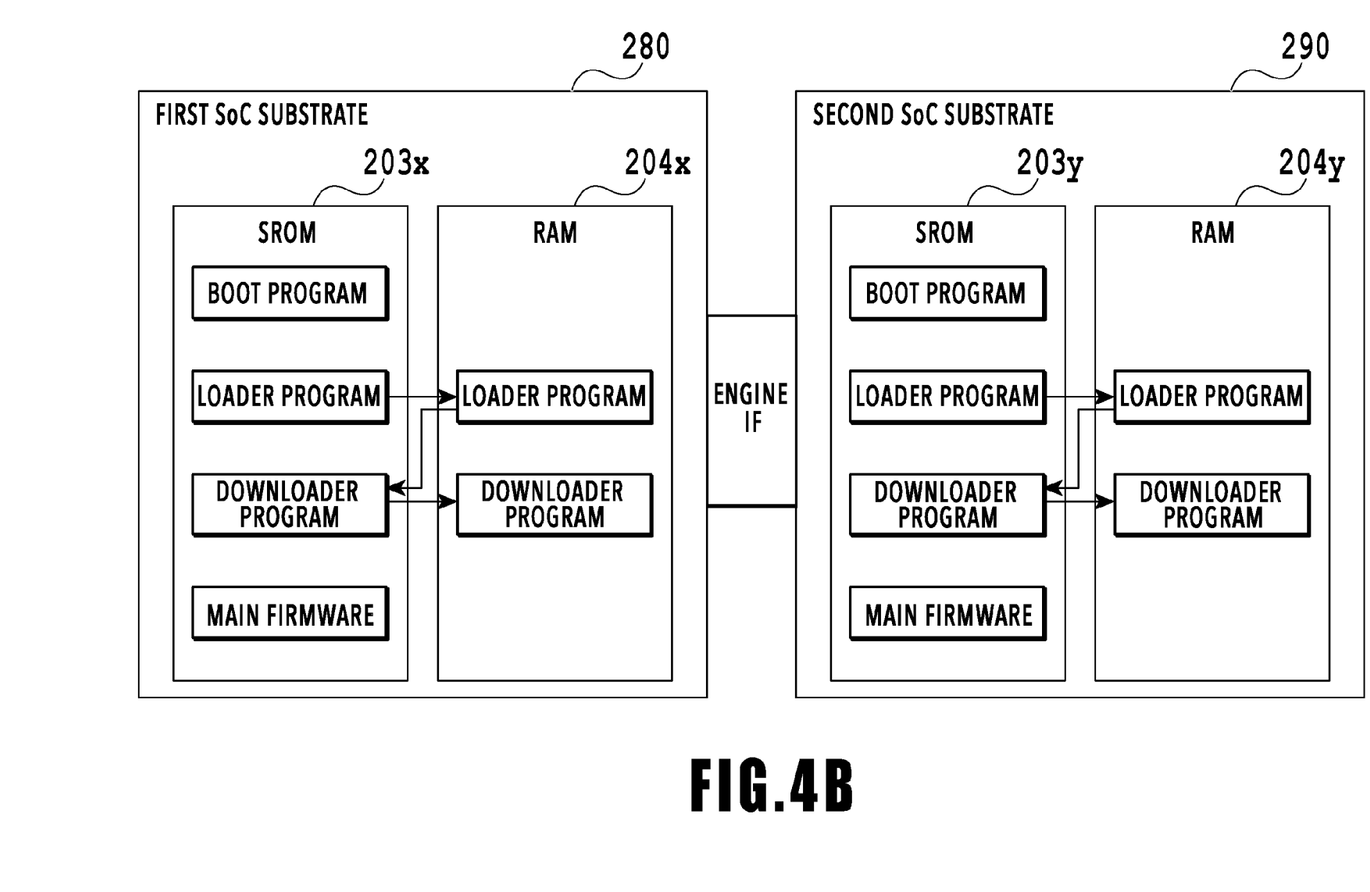

In the present embodiment, the updating processing of firmware data is performed by switching between two modes: a normal mode and a firmware updating mode. The normal mode is a mode in which the printing apparatus 1 is controlled by the current firmware data saved in the SROM 203x and the SROM 203y. In contrast to this, the firmware updating mode is a mode in which the firmware data saved in the SROMs 203x and 203y is updated by the firmware updating data transmitted from the host apparatus 400, In the following, the normal mode and the firmware updating mode are explained by using FIG. 4A and FIG. 4B. FIG. 4A is an explanatory diagram of the operation at the time of activation in the normal mode and FIG. 4B is an explanatory diagram of the operation in the firmware updating mode.

First, the operation at the time of activation in the normal mode is explained by using FIG. 4A. In the case where the printing apparatus 1 activates in the normal mode, the CPU 211x of the first SoC substrate 280 and the CPU 211y of the second SoC substrate 290 start the operation respectively at the same time by receiving commands from the high-order controller unit 100. The start timing of the operation may shift somewhat. Then, the CPU 211x of the first SoC substrate 280 executes a boot program saved in the SROM 203x and the CPU 211y of the second SoC substrate 290 executes a boot program saved in the SROM 203y. Due to this, initialization for causing the SoC substrate 280 and the SoC substrate 290 to operate is performed.

After this, a loader program saved in the SROM 203x is loaded onto the RAM 204x and a loader program saved in the SROM 203y is loaded onto the RAM 204y. Due to this, the program counter is moved to the RAM area side.

After this, by the CPU 211x executing the loader program loaded onto the RAM 204x, the main firmware saved in the SROM 203x is loaded onto the RAM 204x. At this time, the value of the program counter changes into a predetermined address (address of the main firmware). Similarly, by the CPU 211y executing the loader program loaded onto the RAM 204y, the main firmware saved in the SROM 203y is loaded onto the RAM 204y.

After this, the CPU 211x executes the main firmware loaded onto the RAM 204x and the CPU 211y executes the main firmware loaded onto the RAM 204y. Due to this, an engine IF (in the present embodiment, PCIe) between the SoC substrates is brought into conduction and connection between the chips is established, and then, initialization of a power source, an actuator, and sensors belonging to each SoC substrate is performed and a state where the printing operation can be performed is brought about.

Following the above, the operation in the firmware updating mode is explained by using FIG. 4B. In the firmware updating mode, the CPU 211x of the SoC substrate 280 and the CPU 211y of the SoC substrate 290 start the operation respectively at the same time by receiving commands from the high-order controller unit 100. The start timing of the operation may shift somewhat. Then, the CPU 211x of the first SoC substrate 280 executes the boot program saved in the SROM 203x and the CPU 211y of the second SoC substrate 290 executes the boot program saved in the SROM 203y. Due to this, initialization processing for causing the SoC substrate 280 and the SoC substrate 290 to operate is performed.

After this, the loader program saved in the SROM 203x is loaded onto the RAM 204x and the loader program saved in the SROM 203y is loaded onto the RAM 204y. Due to this, the program counter is moved to the RAM area side.

After this, by the CPU 211x executing the loader program loaded onto the RAM 204x, a downloader program saved in the SROM 203x is loaded onto the RAM 204x. At this time, the value of the program counter changes into a predetermined address (address of the downloader program). Similarly, by the CPU 211y executing the loader program loaded onto the RAM 204y, a downloader program saved in the SROM 203y is loaded onto the RAM 204y.

The CPU 211x of the SoC substrate 280 executes the downloader program loaded onto the RAM 204x and the CPU 211y of the SoC substrate 290 executes the downloader program loaded onto the RAM 204y. Due to this, an engine IF between the SoC substrate 280 and the SoC substrate 290 is brought into conduction, communication between both the SoC substrates is established, and the SoC substrate 280 and the SoC substrate 290 enter a state of capable of receiving firmware updating data from the high-order controller unit 100.

By the CPU 211x executing the downloader program loaded onto the RAM 204x, it is made possible for the first SoC substrate 280 to transfer part or all of the firmware updating data received by the first SoC substrate 280 itself to the second SoC substrate 290 via the engine IF.

The case is discussed where the power source of the printing apparatus 1 is turned off by a power failure or the like during the firmware data updating processing, that is, while the main firmware saved in the ROM is being rewritten. In this case, on a condition that the boot program, the loader program, and the downloader program are not broken, it is possible to activate the printing apparatus 1 again in the firmware updating mode although it is not possible to activate in the normal mode. Consequently, it is possible to perform the updating processing of the firmware data again.

In view of the above-described contents, in the present specification, the boot program, the loader program, and the downloader program are represented as "unrecoverable data" and on the other hand, the main firmware is represented as "recoverable data". Further, the SROM area in which the unrecoverable data, such as the boot program, the loader program, and the downloader program, is arranged is represented as an "unrecoverable data area" and on the other hand, the SROM area in which the main firmware is arranged is represented as a "recoverable data area". In the case where the power source of the printing apparatus 1 is turned off by a power failure or the like while the unrecoverable data is being written to the unrecoverable data area, the activation in the firmware updating mode fails at the time of turning on the power source afterward, and it is no longer possible to write the firmware data again.

It can also be said that the unrecoverable data is programs necessary for entering the firmware updating mode. That is, in order to enter the firmware updating mode, the boot program, the loader program, and the downloader program are necessary, and therefore, in the present embodiment, these programs correspond to the unrecoverable data. On the other hand, it can also be said that the recoverable data is a program not necessary for entering the firmware updating mode. That is, in the present embodiment, the main firmware corresponds to the recoverable data.

In the case where the power source is turned off during updating of the unrecoverable data, it may become necessary to replace the substrate with another, and the like.

<About Structure of Firmware Updating Data Turned into Package>

Figure 5A:
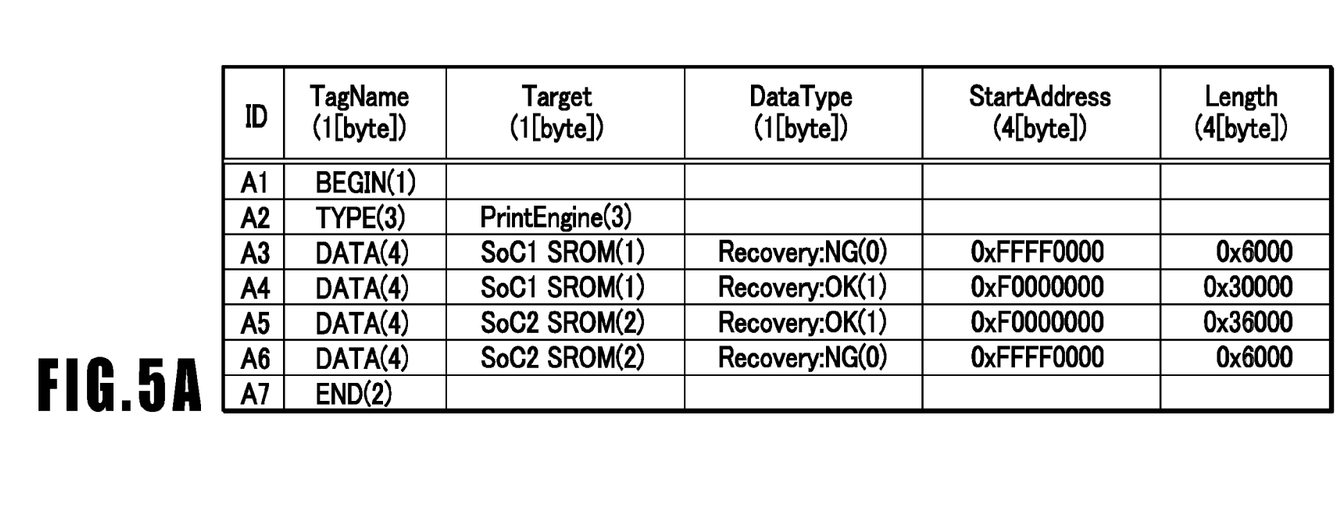
FIG. 5A and FIG. 5B are explanatory diagrams of structures of firmware updating data.

In the following, the structure of the firmware updating data in the present embodiment is explained. Data used for updating of firmware data in the present embodiment (firmware updating data) is turned into a package and includes a plurality of pieces of package data. FIG. 5A is a diagram showing a structure example of the firmware updating data that can be used in the present embodiment. The print engine unit 200 has in advance definition information (array aspect of data and the like) relating to the structure of the firmware updating data such as this and it is possible for the CPUs 211x and 211y to interpret the firmware updating data based on the definition information.

The firmware updating data shown in FIG. 5A includes seven pieces of package data arranged in the order of package data A1, package data A2, . . . , package data A7 from the top. As the definition information on package data, there are a tag name (TagName), a target of data write (Target), a data type (DataType), a start address (StartAddress·4 bytes), and a data size (Length).

The package data A1 includes only a start tag indicting the start of the firmware updating data.

The tag name (TagName value) of the package data A2 is TYPE (3) and the Target value is PrintEngine (3). These values mean that the package data A2 is data for the print engine unit 200.

The tag name of the package data A3 is DATA (4), which is a value indicating that data (referred to as real data) written to the SROM actually is included. Further, the target of write of the package data A3 is the SROM 203x of the first SoC substrate 280 because the Target value is SoC1 SROM (1). The data type of the package data A3 is unrecoverable data because the DataType value is Recovery: NG (0). The start address of the package data A3 is 0xFFFF0000 and the size is 0x6000.

The tag name of the package data A4 is DATA (4), which is a value indicating that real data is included. Further, the target of write of the package data A4 is the SROM 203x of the first SoC substrate 280 because the Target value is SoC1 SROM (1). The data type of the package data A4 is recoverable data because the DataType value is Recovery: OK (1). The start address of the package data A4 is 0xF0000000 and the size is 0x30000.

The tag name of the package data A5 is DATA (4), which is a value indicating that real data is included. Further, the target of write of the package data A5 is the SROM 203y of the second SoC substrate 290 because the Target value is SoC 2 SROM (2). The data type of the package data A5 is recoverable data because the DataType value is Recovery: OK (1). The start address of the package data A5 is 0xF0000000 and the size is 0x36000.

The tag name of the package data A6 is DATA (4), which is a value indicating that real data is included. Further, the target of write of the package data A6 is the SROM 203y of the second SoC substrate 290 because the Target value is SoC2 SROM (2). The data type of the package data A6 is unrecoverable data because the DataType value is Recovery: NG (0). The start address of the package data A6 is 0xFFFF0000 and the size is 0x6000. Each of the package data A3 to A6 has the structure in which following the Length value indicating a size, real data corresponding to the size is arranged, but in FIG. 5A, real data is not shown schematically.

The package data A7 includes only the end tag indicating the end of the firmware updating data.

<About Updating Processing of Firmware Data in Print Engine Unit>

A user (administrator or the like) operates the operation panel 104 and gives instructions to make a transition into the firmware updating mode. In the case where instructions to make a transition into the firmware updating mode are given, the controller unit 100, the print engine unit 200, and the scanner engine unit 300 perform termination processing to terminate the normal activation mode, respectively, and make a transition into the firmware updating mode. Due to this, the printing apparatus 1 enters a state (referred to as data reception state) of waiting for firmware updating data sent from the host apparatus 400 via the host IF 102.

After the printing apparatus 1 enters the data reception state, a user transmits firmware updating data from the host apparatus 400. That is, in this case, the firmware updating data is acquired in advance by the host apparatus 400. Here, a case where the firmware updating data shown in FIG. 5A is used is explained. Further, as another method of firmware updating, there is an updating method that makes use of a network. That is, the printing apparatus 1 periodically accesses a server determined in advance and determines whether or not there is firmware updating data in the server. Here, in the case of determining that there is firmware updating data in the server, the printing apparatus 1 displays an inquiry about whether or not a firmware updating program is acquired on the operation panel of the printing apparatus 1. Then, it may also be possible for the printing apparatus 1 to acquire firmware updating data from the server by a user giving instructions to acquire the program for the inquiry. The controller unit 100 starts reception of the firmware updating data via the host IF 102 and temporarily saves the received firmware updating data in the RAM 106. The main controller 101 of the controller unit 100 determines that the received firmware updating data is for the print engine unit 200 because the Target value of the package data A2 is PrintEngine (3). Consequently, after this, the main controller 101 transfers the firmware updating data to the first SoC substrate 280 of the print engine unit 200 via the print engine IF 105 and the controller engine IF 201x. The transferred firmware updating data is saved temporarily in the RAM 204x of the first SoC substrate 280.

Figure 6:
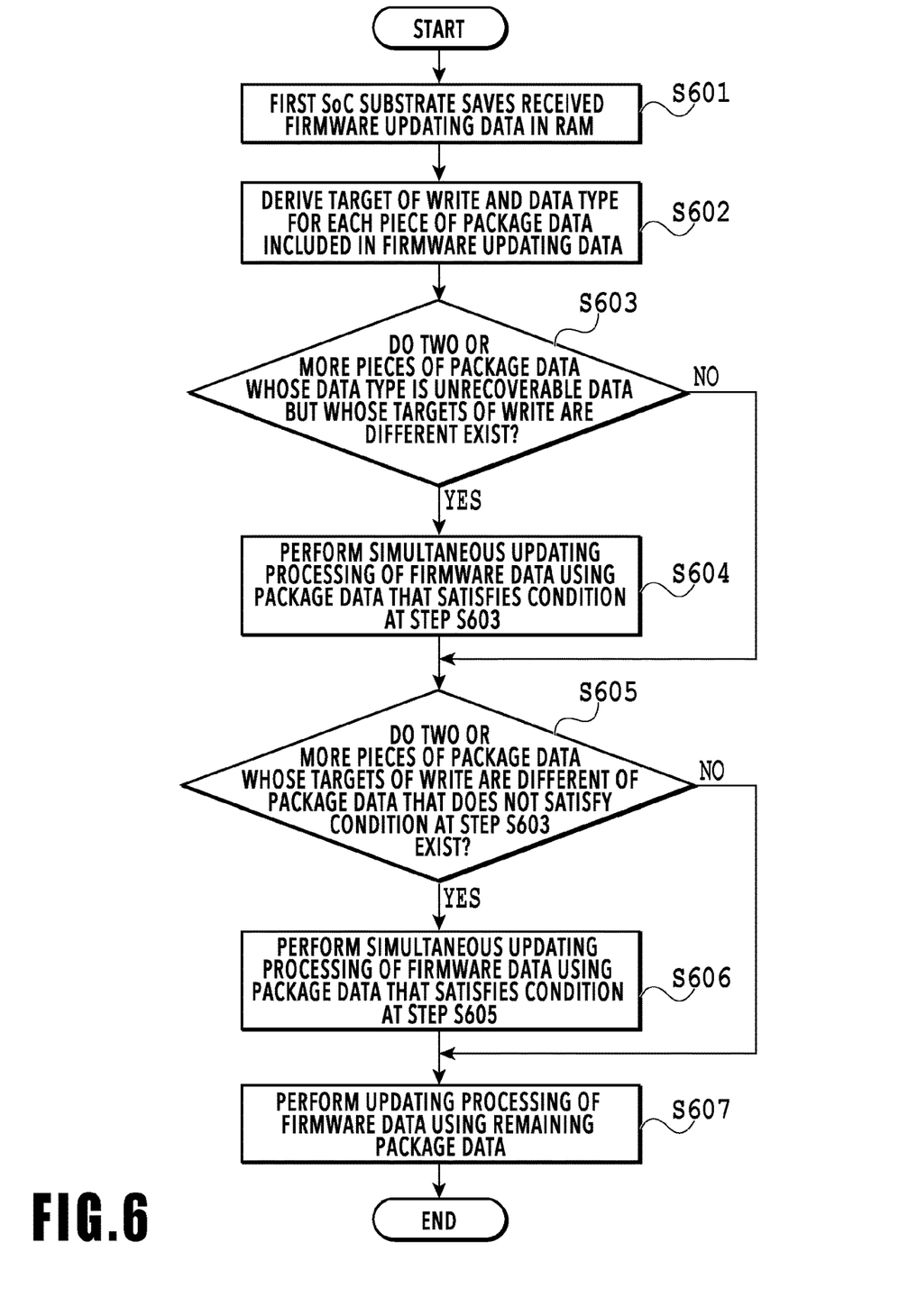
FIG. 6 is a flowchart of updating processing of firmware data in the first embodiment.

FIG. 6 is a flowchart of updating processing of firmware data performed on the side of the print engine unit 200 in the present embodiment.

At step S601, the first SoC substrate 280 temporarily saves the firmware updating data received via the controller engine IF 201x in the RAM 204x. Here, a case where the firmware updating data shown in FIG. 5A is used is explained. As described above, the firmware updating data is turned into a package and includes the package data A1 to A7.

At step S602, the CPU 211x of the first SoC substrate 280 checks the definition information on all the package data included in the firmware updating data saved in the RAM 204x. Then, the CPU 211x derives the target of write and the data type for each piece of package data.

At step S603, the CPU 211x determines whether two or more pieces of package data whose data type is unrecoverable data but whose targets of write are different exists within the firmware updating data based on the results at step S602. In the case where the determination results at step S603 are affirmative, the processing advances to step S604. On the other hand, in the case where the determination results are negative, the processing advances to step 605. In the case where the firmware updating data shown in FIG. 5A is used, the data type of the package data A3 is unrecoverable data and the target of write thereof is the SROM 203x of the first SoC substrate 280. Further, the data type of the package data A6 is unrecoverable data and the target of write thereof is the SROM 203y of the second SoC substrate 290. Consequently, the two pieces of package data whose data type is unrecoverable data but whose targets of write are different exist, and therefore, the processing advances to step S604.

At step S604, the CPU 211x of the first SoC substrate 280 and the CPU 211y of the second SoC substrate 290 perform control so that updating of the firmware data by the package data that satisfies the condition at step S603 is performed at the same time. Specifically, by the control of the CPU 211x, updating of the firmware data is performed at the same time.

The simultaneous updating processing of firmware data at step S604 is explained in detail. First, the CPU 211x of the first SoC substrate 280 transfers part of the firmware updating data saved in the RAM 204x at step S601 to the second SoC substrate 290 via the controller engines IFs 201x and 201y. The firmware updating data transferred here is specifically package data whose target of write is the SROM 203y of the package data that satisfies the condition at step S603. The firmware updating data transferred to the second SoC substrate 290 is temporarily saved in the RAM 204y. After the transfer of data, the CPU 211x performs deletion of the data saved in the unrecoverable data area 505x and writing of the unrecoverable data temporarily saved in the RAM 204x to the unrecoverable data area 505x. Further, at the same time as this, the CPU 211x gives instructions to delete the data saved in the unrecoverable data area 505y and to write the unrecoverable data temporarily saved in the RAM 204y to the unrecoverable data area 505y to the CPU 211y. The above is the contents of the simultaneous updating processing of firmware data.

In the case where the firmware updating data shown in FIG. 5A is used, the instructions to write the package data A3 to the SROM 203x and the instructions to write the package data A6 to the SROM 203y are given substantially at the same timing. Consequently, the writing of the data to each SROM is started substantially at the same timing and further, the size of the data is the same, and therefore, the writing of the data to each SROM is completed substantially at the same timing. It is only required for the processing at step S604 to be performed so that the writing processing to the SROM 203x and the writing processing to the SROM 203y are performed with at least part thereof being performed in parallel.

At step S605, the CPU 211x determines whether, of the package data that does not satisfy the condition at step S603, two or more pieces of package data whose targets of write are different exist. In the case where the determination results at step S605 are affirmative, the processing advances to step S606. On the other hand, in the case where the determination results are negative, the processing advances to step S607. In the case where the firmware updating data shown in FIG. 5A is used, the target of write of the package data A4 is the SROM 203x of the first SoC substrate 280 and the target of write of the package data A5 is the SROM 203y of the second SoC substrate 290. Consequently, of the package data that does not satisfy the condition at step S603, the two pieces of package data whose targets of write are different exist, and therefore, the processing advances to step S606.

At step S606, the CPU 211x of the first SoC substrate 280 and the CPU 211y of the second SoC substrate 290 perform control so that the updating of the firmware data by the package data that satisfies the condition at step S605 is performed at the same time. The simultaneous updating processing of firmware data at this step is the same as the simultaneous updating processing of firmware data at step S604. In the case where the firmware updating data shown in FIG. 5A is used, the instructions to write the package data A4 to the SROM 203x and the instructions to write the package data A5 to the SROM 203y are given substantially at the same timing.

At step S607, in the case where remaining package data exists, the CPU 211x and the CPU 211y perform control so as to perform updating processing of the firmware data by the remaining package data, and the series of processing is completed. The remaining package data referred to here is the package data that satisfies neither condition at step S603 nor condition at step S605. In the case where the firmware updating data shown in FIG. 5A is used, the package data corresponding thereto does not exist, and therefore, the updating processing of firmware data at this step is not performed. The above is the contents of the updating processing of firmware data in the present embodiment.

About Effect, Modification Example and so on of the Present Embodiment

In the present embodiment, firmware data is updated by performing rewriting of data at the same time for a plurality of ROMs based on the data type. Due to this, it is possible to reduce the time zone in which there is a possibility that it becomes no longer possible to activate the printing apparatus 1 by turning off the power source, specifically, the time during which unrecoverable data is written to the ROM. In the present embodiment, as described above, rewriting of data in the ROM is performed in the order of unrecoverable data and recoverable data. However, by supposing a scene in which a user intends to cancel the operation after performing updating processing of firmware data and turns off the power source of the printing apparatus, it may also be possible to perform rewriting of data in the ROM in the order of recoverable data and unrecoverable data.

Further, in the present embodiment, by using the condition that data is unrecoverable data and the condition that the target of write is different, whether it is possible to update firmware data in different ROMs at the same time is determined (step S603 in FIG. 6). Here, it may also be possible to determine timing of updating by taking into consideration the time required for writing of each piece of package data, in addition to those conditions. By doing so, it is made possible to perform more strict control for the task to reduce the time zone in which there is a possibility that it becomes no longer possible to activate the printing apparatus 1 by turning off the power source.

To explain specifically, at step S603 in FIG. 6, at the time of checking the target of write and the data type for each piece of package data, the size (Length value) for each piece of package data is also checked.

The time required for writing is a predicted value calculated based on the device of the target of write and the data size. In the case where writing is performed for a plurality of ROMs and the writing speed in each ROM is the same, it may be possible to calculate the time required for writing based on only the data size. Further, the time required for writing may include the time required for deletion of data, in addition to the time required for writing of data.

At step S603, in a situation in which it is possible to grasp the time required for writing, it is not necessarily required to start writing of data to a plurality of ROMs at the same time. It is only required to adjust the timing of writing and the like so that updating of the other ROMs is completed within the updating time of the ROM having the longest updating time.

It may also be possible to determine the order of writing of the package data for which it is determined that simultaneous updating is not performed at step S603 so that the updating time becomes the shortest based on the time required for writing and the device of the target of write. Due to this, it is made possible to further reduce the time required for updating processing of firmware data.

Second Embodiment

In the first embodiment, the CPU 211x of the first SoC substrate 280 analyzes firmware updating data (step S602 in FIG. 6) and determines whether to perform simultaneous updating of firmware data (step S603 in FIG. 6, and then step S605). In contrast to this, in the present embodiment, a method of omitting the determination of whether to perform simultaneous updating of firmware data is explained.

<About Firmware Updating Data>

Figure 5B:
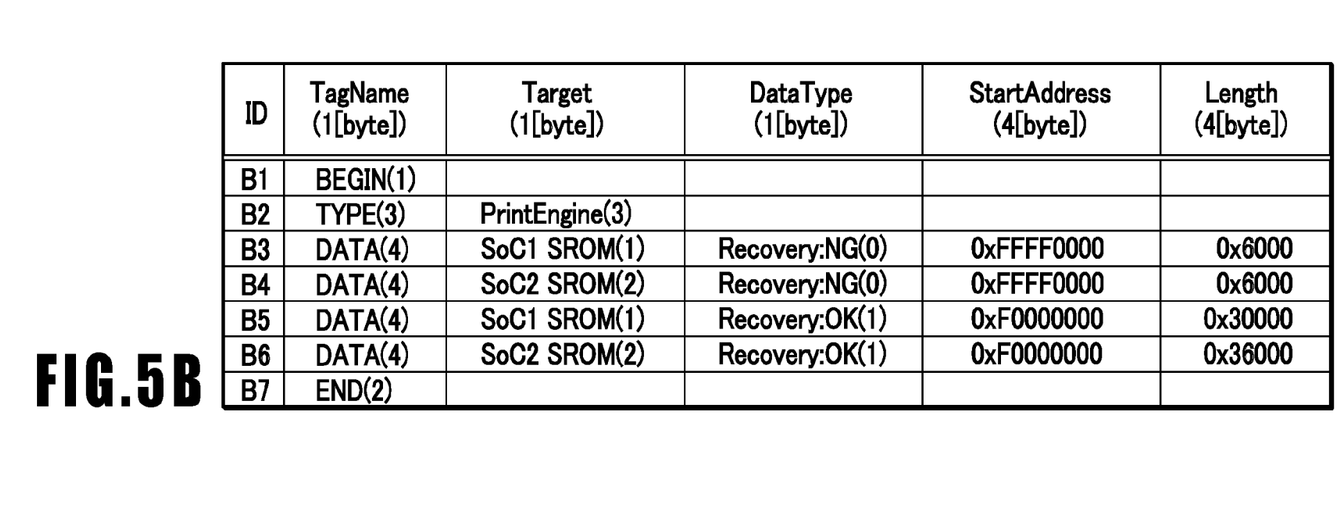

FIG. 5B is a diagram showing a structure example of firmware updating data that can be used in the present embodiment. The firmware updating data shown in FIG. 5B includes seven pieces of package data arranged in the order of package data B1, package data B2, . . . , package data B7 from the top. The firmware updating data shown in FIG. 5B includes the same contents as those of the firmware updating data shown in FIG. 5A, but the order of arrangement of data is different from that of the firmware updating data shown in FIG. 5A.

<About Updating Processing of Firmware Data>

Figure 7:
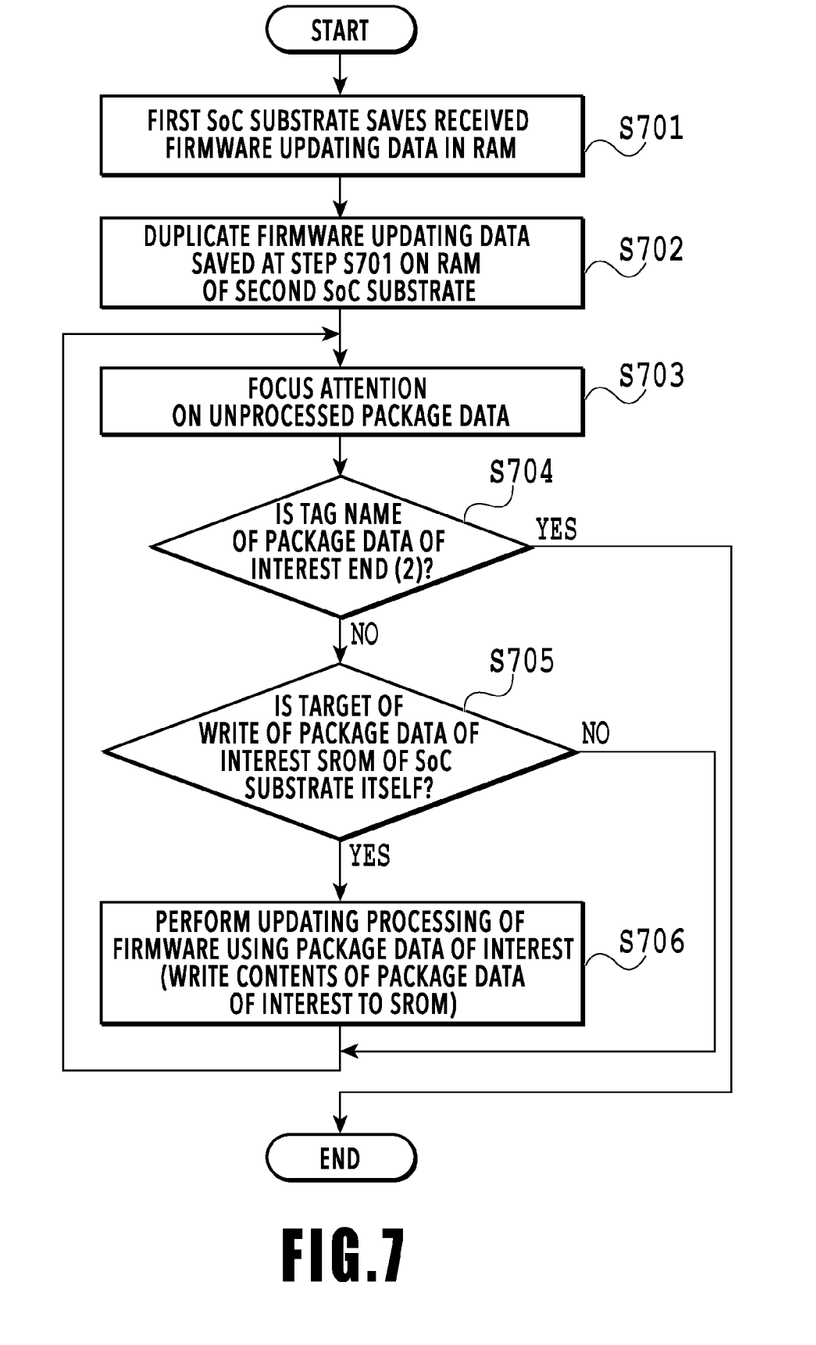
FIG. 7 is a flowchart of updating processing of firmware data in a second embodiment.

In the following, updating processing of firmware data in the present embodiment is explained by using FIG. 7.

At step S701, the first SoC substrate 280 temporarily saves firmware updating data received via the controller engine IF 201x in the RAM 204x corresponding to the SROM 203x. This step is the same as step S601 of the first embodiment.

At step S702, the CPU 211x and the CPU 211y duplicate and save the firmware updating data temporarily saved in the RAM 204x at step S701 for the RAM 204y corresponding to the SROM 203y. This processing is implemented by the CPU 211x transferring the firmware updating data saved in the RAM 204x at step S701 to the second SoC substrate 290 via the controller engine IFs 201x and 201y.

At the time of duplicating the firmware updating data on the RAM 204, there is a possibility that the time required for data duplication and the amount of RAM that is used can be reduced by selecting and duplicating only the data for the second SoC substrate 290. However, the time for selecting data is required additionally, and therefore, the relationship between the time required for data duplication and the time required for data selection is a trade-off relationship. Consequently, in the present embodiment, it is assumed that the data transfer speed is high, and therefore, the firmware updating data (that is, all the package data included in the firmware updating data) is duplicated as it is on the RAM 204y without performing data selection.

After the duplication of the firmware updating data saved in the RAM 204x to the RAM 204y is completed, the CPU 211x receives a notification to the effect that the updating preparation of firmware data is completed from the CPU 211y. After this, the CPU 211x instructs the CPU 211y to start updating in the second SoC substrate 290 and immediately after this, gives instructions to start updating in the first SoC substrate 280. Then, at step S703 to step S706 below, updating of the firmware data in the first SoC substrate 280 and the second SoC substrate 290, respectively, is performed.

At step S703, the CPU 211x of the first SoC substrate 280 focuses attention on one piece of unprocessed package data of the firmware updating data saved in the RAM 204x (setting of package data of interest). Similarly, the CPU 211y of the second SoC substrate 290 focuses attention on one piece of unprocessed package data of the firmware updating data saved in the RAM 204y. The setting of the package data of interest at this step is performed in accordance with the array within the firmware updating data (in order from the top).

At step S704, the CPU 211x of the first SoC substrate 280 determines whether the tag name of the package data of interest is END (2) indicating the end of the firmware updating data. In the case where the determination results at this step are affirmative, the series of processing terminates. On the other hand, in the case where the determination results are negative, the processing advances to step S705. Similarly, the CPU 211y of the second SoC substrate 290 determines whether the tag name of the package data of interest is END (2) indicating the end of the firmware updating data.

At step S705, the (CPU 211x of the) first SoC substrate 280 determines whether the target of write of the package data of interest is the SROM 203x of the first SoC substrate 280 itself based on the Target value of the package data of interest. In the case where the determination results at this step are affirmative, the processing advances to step S706. On the other hand, in the case where the determination results are negative, the processing returns to step S703. The (CPU 211y of the) second SoC substrate 290 similarly determines whether the target of write of the package data of interest is the SROM 203y of the second SoC substrate 290 itself based on the Target value of the package data of interest.

At step S706, the CPU 211x performs the updating processing of the firmware data by the package data of interest that satisfies the condition at step S705, specifically, writes the contents of the package data of interest to the SROM 203x. Similarly, the CPU 211y performs the updating processing of the firmware data by the package data of interest that satisfies the condition at step S705, specifically, writes the contents of the package data of interest to the SROM 203y. Next, the processing returns to step S703. The above is the contents of the updating processing of firmware data in the present embodiment.

<About Specific Example of Updating Processing of Firmware Data>

In the following, the case where the updating processing of firmware data in the present embodiment is performed by using the firmware updating data shown in FIG. 5B is explained.

In this case, writing using the package data B3 and writing using the package data B5 for the SROM 203x of the first SoC substrate 280 are performed sequentially. Further, writing using the package data B4 and writing using the package data B6 for the SROM 203y of the second SoC substrate 290 are performed sequentially. As a result, execution of writing using the package data B3 and execution of writing using the package data B4 are started and terminated substantially at the same timing.

As described above, in the present embodiment, the order of arrangement of data within the firmware updating data is devised. Specifically, within the firmware updating data, data is arranged in the order of unrecoverable data and recoverable data (specifically, in the order of the package data B3, B4, B5, and B6). By arranging all the unrecoverable data together nearer to the top side than recoverable data, it is made possible to synchronize updating of firmware data by unrecoverable data in different SROMs, that is, to make the same the start timing of updating by unrecoverable data as much as possible. As described above, by devising the order of arrangement of data within the firmware updating data, it is possible to obtain the same effect as that of the first embodiment also in the aspect in which processing to determine whether to perform simultaneous updating is not performed.

About Effect, Modification Example and so on of the Present Embodiment

By the present embodiment, it is possible to reduce the time zone in which there is a possibility that it is no longer possible to activate the printing apparatus 1 by turning off the power source, specifically, the time zone in which unrecoverable data is written to the ROM.

In the above-described embodiment, the configuration in which the printing apparatus mounts a plurality of SoC substrates is explained, but the number of SoC substrates included in the printing apparatus is not limited to two or more, but may be one. That is, it is possible to apply the present invention to any printing apparatus including a plurality of nonvolatile memories and capable of performing writing to the nonvolatile memories in parallel.

Further, in the above-described embodiment, the case where the present invention is applied to the ink jet printing apparatus is explained, but it may also be possible to apply the present invention to an information processing apparatus other than the ink jet printing apparatus. That is, it is possible to apply the present invention to an information processing apparatus including a plurality of nonvolatile memories (for example, automobile, industrial device, mobile electronic device, server and so on).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an apparatus having a plurality of nonvolatile memories, it is possible to reduce the time required for updating of firmware data using unrecoverable data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222817, filed Nov. 20, 2017, which is hereby incorporated by reference wherein in its entirety.

What is claimed is:

1. An apparatus having a plurality of nonvolatile memories, the apparatus comprising:
   an acquisition unit configured to acquire firmware updating data for updating firmware data saved in each of the plurality of nonvolatile memories;
   a determination unit configured to determine whether the firmware updating data includes first parallel update data saved in a first nonvolatile memory and second parallel update data saved in a second nonvolatile memory different from the first nonvolatile memory; and
   a control unit configured to perform control so as to perform in parallel updating using the first parallel update data and updating using the second parallel update data, in a case where the determination unit determines that the firmware updating data includes the first parallel update data saved in the first nonvolatile memory and the second parallel update data saved in the second nonvolatile memory different from the first nonvolatile memory,
   wherein the acquisition unit, the determination unit, and the control unit are implemented by at least one processor of the apparatus.

2. The apparatus according to claim 1, wherein
   the firmware updating data includes a plurality of pieces of package data,
   as definition information on the package data, there are a tag name, a target of write, a data type, a start address, and a data size, and
   the data type indicates the parallel update data or non-parallel update data.

3. The apparatus according to claim 2, wherein
   the control unit gives instructions to perform deletion of the firmware data saved in the first nonvolatile memory and writing of the first parallel update data to the first nonvolatile memory and in parallel to the instructions, gives instructions to perform deletion of the firmware data saved in the second nonvolatile memory and writing of the second parallel update data to the second nonvolatile memory.

4. The apparatus according to claim 2, wherein
   the control unit performs control based on the target of write and the data type for each piece of package data making up the firmware updating data.

5. The apparatus according to claim 4, wherein
   the control unit performs control based on a time required for writing to the nonvolatile memory for each piece of the package data.

6. The apparatus according to claim 5, further comprising:
   a calculation unit configured to calculate the time based on the data size and the target of write for each piece of the package data,
   wherein the calculation unit is implemented by the at least one processor of the apparatus.

7. The apparatus according to claim 6, wherein
   the control unit performs control so that an updating time of the firmware data saved in the first nonvolatile memory by the first parallel update data is less than an updating time of the firmware data saved in the second nonvolatile memory by the second parallel update data.

8. The apparatus according to claim 2, wherein
   the control unit updates the firmware data in order of the parallel update data and the non-parallel update data or in order of the non-parallel update data and the parallel update data.

9. The apparatus according to claim 2, wherein
   the parallel update data is arranged nearer to the beginning top side than the non-parallel update data within the firmware updating data.

10. The apparatus according to claim 9, wherein
    the acquired firmware updating data is saved in a first volatile memory corresponding to the first nonvolatile memory, and
    the firmware updating data saved in the first volatile memory is duplicated in a second volatile memory corresponding to the second nonvolatile memory.

11. The apparatus according to claim 10, wherein
    the control unit performs writing to the first nonvolatile memory by package data whose target of write is the first nonvolatile memory of the firmware updating data saved in the first volatile memory and performs writing to the second nonvolatile memory by package data whose target of write is the second nonvolatile memory of the firmware updating data duplicated in the second volatile memory.

12. The apparatus according to claim 1, further comprising:
    a print control unit configured to perform printing processing using ink based on print data,
    wherein the print control unit is implemented by the at least one processor of the apparatus.

13. A control method of an apparatus having a plurality of nonvolatile memories, the control method comprising:
    acquiring firmware updating data for updating firmware data saved in each of the plurality of nonvolatile memories;
    determining whether the firmware updating data includes first parallel update data saved in a first nonvolatile memory and second parallel update data saved in a second nonvolatile memory different from the first nonvolatile memory; and
    controlling so as to perform in parallel updating using the first parallel update data and updating using the second parallel update data, in a case where the determining determines that the firmware updating data includes the first parallel update data saved in the first nonvolatile memory and the second parallel update data saved in the second nonvolatile memory different from the first nonvolatile memory.

14. The method according to claim 13, wherein
    the firmware updating data includes a plurality of pieces of package data,
    as definition information on the package data, there are a tag name, a target of write, a data type, a start address, and a data size, and
    the data type indicates the parallel update data or non-parallel data.

15. The method according to claim 14, wherein
    instructions to perform deletion of the firmware data saved in the first nonvolatile memory and writing of the first parallel update data to the first nonvolatile memory and instructions to perform deletion of the firmware data saved in the second nonvolatile memory and writing of the second parallel update data to the second nonvolatile memory are given in parallel.

16. The method according to claim 14, wherein
    the firmware data is updated in order of the parallel update data and the non-parallel update data or in order of the non-parallel update data and the parallel update data.

17. The method according to claim 14, wherein
    the parallel update data is arranged nearer to the beginning than the non-parallel update data within the firmware updating data.

18. The method according to claim 17, wherein
the acquired firmware updating data is saved in a first volatile memory corresponding to the first nonvolatile memory, and
the firmware updating data saved in the first volatile memory is duplicated in a second volatile memory corresponding to the second nonvolatile memory.

19. The method according to claim 13, further comprising:
performing printing processing using ink based on print data.

20. A non-transitory computer readable storage medium storing a program for causing a computer to perform a control method of an apparatus having a plurality of nonvolatile memories, the control method comprising:
acquiring firmware updating data for updating firmware data saved in each of the plurality of nonvolatile memories;
determining whether the firmware updating data includes first parallel update data saved in a first nonvolatile memory and second parallel update data saved in a second nonvolatile memory different from the first nonvolatile memory; and
controlling so as to perform in parallel updating using the first parallel update data and updating using the second parallel update data, in a case where the determining determines that the firmware updating data includes the first parallel update data saved in the first nonvolatile memory and the second parallel update data saved in the second nonvolatile memory different from the first nonvolatile memory.

* * * * *